US012329714B2

(12) United States Patent
Jeppsson et al.

(10) Patent No.: US 12,329,714 B2
(45) Date of Patent: Jun. 17, 2025

(54) MECHANICAL CARDIO PULMONARY RESUSCITATION DEVICE HAVING A CONTACT MEMBER

(71) Applicant: Physio-Control, Inc., Redmond, WA (US)

(72) Inventors: Anders Jeppsson, Lund (SE); Fred W. Chapman, Newcastle, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 825 days.

(21) Appl. No.: 17/460,614

(22) Filed: Aug. 30, 2021

(65) Prior Publication Data

US 2022/0062099 A1 Mar. 3, 2022

Related U.S. Application Data

(60) Provisional application No. 63/074,033, filed on Sep. 3, 2020.

(51) Int. Cl.
*A61H 31/00* (2006.01)
*A61H 9/00* (2006.01)

(52) U.S. Cl.
CPC ........... *A61H 31/006* (2013.01); *A61H 9/005* (2013.01); *A61H 2009/0064* (2013.01); *A61H 2201/105* (2013.01); *A61H 2201/1664* (2013.01); *A61H 2201/5007* (2013.01)

(58) Field of Classification Search
None
See application file for complete search history.

(56) References Cited

U.S. PATENT DOCUMENTS 6,676,613 B2 * 1/2004 Cantrell ................. A61H 31/00 601/44
8,079,968 B2 * 12/2011 Hoffmann ............ A61B 17/225 601/48
8,702,633 B2 * 4/2014 Voss ..................... A61H 31/004 601/41
8,920,348 B2 * 12/2014 Freeman .............. A61H 31/006 601/44
9,517,176 B2 * 12/2016 Lach .................... A61H 31/007
10,004,662 B2 * 6/2018 Jeppsson .............. A61H 31/006
10,292,899 B2 * 5/2019 Nilsson ................ A61H 31/004
10,507,161 B2 * 12/2019 Ehrstedt ............... A61H 31/006
10,780,020 B2 * 9/2020 Hunt .................... A61H 31/005
(Continued)

*Primary Examiner* — LaToya M Louis
(74) *Attorney, Agent, or Firm* — Miller Nash LLP

(57) ABSTRACT

A mechanical CPR device having one or more of a piston, a driving component configured to extend the piston toward a patient's torso and retract the piston away from the patient's torso, a controller configured to control the driving component to at least compress the patient's torso by extending the piston from a reference position to a depth and retracting the piston from the depth to the reference position, and a contact member such as one or more of a pressure pad and a suction cup attached to the end of the piston. The contact member can include a semi-adhesive material that has low adhesiveness when the controller controls the driving component to compress the patient's torso less than 60 times per minute and high adhesiveness when the controller controls the driving component to compress the patient's torso more than 60 times per minute.

14 Claims, 7 Drawing Sheets

(56) References Cited

U.S. PATENT DOCUMENTS

| | | | | |
|---|---|---|---|---|
| 10,832,594 | B2 * | 11/2020 | Tan | A61N 1/3925 |
| 11,123,261 | B2 * | 9/2021 | Voss | A61H 31/004 |
| 11,246,796 | B2 * | 2/2022 | Nilsson | A61H 31/007 |
| 11,701,295 | B2 * | 7/2023 | Freeman | A61H 31/02 128/205.24 |
| 11,793,714 | B2 * | 10/2023 | Lurie | A61G 13/129 |
| 2004/0116840 | A1 * | 6/2004 | Cantrell | A61M 16/0084 601/44 |
| 2014/0288468 | A1 * | 9/2014 | Quintana | A61H 31/00 601/41 |
| 2015/0073314 | A1 * | 3/2015 | Parascandola | A61H 31/00 601/41 |
| 2016/0136042 | A1 * | 5/2016 | Nilsson | A61H 31/006 601/41 |
| 2018/0256445 | A1 * | 9/2018 | Katz | A61H 31/005 |
| 2018/0333327 | A1 * | 11/2018 | Jeppsson | A61H 31/005 |
| 2019/0021943 | A1 * | 1/2019 | Nilsson | A61H 31/005 |
| 2019/0117501 | A1 * | 4/2019 | Chapman | A61H 1/00 |
| 2019/0231640 | A1 * | 8/2019 | Chapman | A61H 31/00 |
| 2019/0231641 | A1 * | 8/2019 | Banville | A61B 5/318 |
| 2020/0121552 | A1 * | 4/2020 | Reynolds | A61H 31/005 |
| 2020/0306133 | A1 * | 10/2020 | Chapman | A61H 31/007 |
| 2023/0338231 | A1 * | 10/2023 | Giacometti | A61H 31/00 |

* cited by examiner

MECHANICAL CARDIO PULMONARY RESUSCITATION DEVICE HAVING A CONTACT MEMBER

PRIORITY

This disclosure claims benefit of U.S. Provisional Application No. 63/074,033, titled "MECHANICAL CARDIO PULMONARY RESUSCITATION DEVICE HAVING A CONTACT MEMBER," filed on Sep. 3, 2020, which is incorporated herein by reference in its entirety.

FIELD

The present disclosure relates to a system and method of Cardio Pulmonary Resuscitation (CPR) including a CPR chest compression machine having a contact member.

BACKGROUND

In certain types of medical emergencies a patient's heart stops working. This stops the blood flow, without which the patient may die. Cardio Pulmonary Resuscitation (CPR) can forestall the risk of death. CPR includes performing repeated chest compressions to the chest of the patient so as to cause their blood to circulate some. CPR also includes delivering rescue breaths to the patient. CPR is intended to merely maintain the patient until a more definite therapy is made available, such as defibrillation. Defibrillation is an electrical shock deliberately delivered to a person in the hope of correcting their heart rhythm.

Guidelines by medical experts such as the American Heart Association provide parameters for CPR to cause the blood to circulate effectively. The parameters are for aspects such as the frequency of the compressions, the depth that they should reach, and the full release that is to follow each of them. The depth is sometimes required to exceed 5 centimeters (cm) (2 inches (in.)). The parameters also include instructions for the rescue breaths.

Traditionally, CPR has been performed manually. A number of people have been trained in CPR, including some who are not in the medical professions just in case. However, manual CPR might be ineffective, and being ineffective it may lead to irreversible damage to the patient's vital organs, such as the brain and the heart. The rescuer at the moment might not be able to recall their training, especially under the stress of the moment. And even the best trained rescuer can become quickly fatigued from performing chest compressions, at which point their performance might be degraded. Indeed, chest compressions that are not frequent enough, not deep enough, or not followed by a full decompression may fail to maintain blood circulation.

The risk of ineffective chest compressions has been addressed with CPR chest compression machines. Such machines have been known by a number of names, for example CPR chest compression machines (CCCM), mechanical CPR devices, cardiac compressors and so on.

CPR chest compression machines repeatedly compress and release the chest of the patient. Such machines can be programmed so that they will automatically compress and release at the recommended rate or frequency, and can reach a specific depth within the recommended range. The repeated chest compressions of CPR are actually compressions alternating with releases of a compression element, such as a piston (also referred to as a plunger) or belt. Conventional CPR machines start from a starting point (also referred to as a reference point), apply the chest compression, then release the compression element back to its starting point to reset and be ready to apply another chest compression, when needed, or according to a protocol. The start position of the compression element is near or physically touching the patient's chest.

Some CPR machines can even exert force upwards during the "release" or decompressions, pulling the chest higher than it would be while at rest—a feature that is called active decompression. Active decompression applies a force to promote the patient's chest to expand after an applied chest compression. During active decompression in examples of a CCCM with a piston with a suction cup, the suction cup creates a vacuum with the patient's chest and applies a force directed away from the anterior surface of the patient's chest to promote chest expansion beyond the chest's starting resting height between chest compressions.

The correct positioning of a mechanical CPR device on a patient's chest is critical due to intended use. In examples of a CCCM with a piston with a contact member such as a pressure pad, a suction cup, or a belt, the contact member distributes the chest compression force from the CPR device to the patient. The contact member may slide or disconnect during mechanical CPR. The reasons for sliding or disconnecting may be chest skin hairiness or the outer shape of the chest. There is a risk that sliding or disconnecting is gradually taking place without the awareness of the user. A sliding contact member may cause injury to the patient. Although big shifts in placement are easily seen, it can be difficult to see that the contact member has shifted small amounts. Importantly, even a small shift toward the head can move the point of compression to be over the left-ventricular outflow tract, where it can greatly impede the desired forward flow of blood. Such a shift needs to be detected and corrected promptly. A partly or fully disconnected contact member may take away the ability to provide active decompression or other intended treatments.

A firmly fixation of the contact member of a CCCM to the patient's chest is essential during active decompression. If the contact member is not firmly attached to the patient's chest undesired effects may occur. For example, if the CCCM continues to lift the contact member, without lifting the patient's chest, the chest may get sore and left with abrasions as the contact member will hit the patient's chest after each lift of the contact member. Furthermore, if the CCCM stops the active decompression the patient will not receive active decompression when desired.

In examples of a CCCM with a piston with a suction cup, the vacuum created between the patient's chest and the suction cup makes it difficult for the suction cup to move laterally from the desired compression area and allows for active decompression as the suction cup can transfer traction. However, the functionality of the suction cup with regards to transferring traction is dependent on a good connection to the patient's chest as it is the low pressure created in the suction cup that contributes to the lifting force. If the connection to the patient's chest is not favorable due to i.e. hairy skin, other properties of the patient's skin or the topography of the chest in general, the suction cup and the CCCM may lose its ability to perform active decompression.

SUMMARY

In some examples, the present disclosure includes a mechanical CPR device having one or more of a piston, a driving component configured to extend the piston toward a patient's torso and retract the piston away from the patient's torso, a controller configured to perform mechanical CPR by controlling the driving component to at least compress the patient's torso by extending the piston from a reference position to a depth and retracting the piston from the depth to a reference position, wherein the reference position is the position from which the depth of CPR compressions are measured, and a pressure pad attached to the end of the piston. The pressure pad can have a pressure pad contact surface area that includes a material disposed on the pressure pad contact surface. The material can be configured to attach to a patient target area and can include a semi-adhesive material that has low adhesiveness when the controller controls the driving component to compress the patient's torso less than 60 times per minute and high adhesiveness when the controller controls the driving component to compress the patient's torso more than 60 times per minute. Additionally or alternatively, the material includes ink configured to mark an initial contact location on the patient's torso.

Additionally or alternatively, the CPR device can include a pressure pad protective layer disposed on the pressure pad such that the material is disposed between the pressure pad contact surface area and the pressure pad protective layer. Additionally or alternatively, the controller is further configured to actively decompress the patient's torso by retracting the piston from the reference position to a height above the reference position, whereby the patient's torso is decompressed above the torso's natural resting position and above the reference position. Additionally or alternatively, the CPR device can also include a suction cup attached to the end of the piston, the suction cup having a suction cup contact surface configured to attach to the patient's torso, the pressure pad disposed within the suction cup and not in contact with the suction cup contact surface.

Alternative examples of the present disclosure can include a mechanical CPR device including a piston, a driving component configured to extend the piston toward a patient's torso and retract the piston away from the patient's torso, a controller configured to perform mechanical CPR by controlling the driving component to at least compress the patient's torso by extending the piston from a reference position to a depth and retracting the piston from the depth to a reference position, wherein the reference position is the position from which the depth of CPR compressions are measured, and a suction cup attached to the end of the piston. The suction cup can have a suction cup contact surface area and a material disposed on the contact surface area, the material configured to attach to a target area on a patient chest. Additionally or alternatively, the material includes ink configured to mark an initial contact location on the patient's torso.

Additionally or alternatively, the CPR device can include a suction cup protective layer disposed on the suction cup such that the material is disposed between the suction cup contact surface area and the suction cup protective layer. Additionally or alternatively, the material includes a semi-adhesive material that has low adhesiveness when the controller controls the driving component to compress the patient's torso less than 60 times per minute and high adhesiveness when the controller controls the driving component to compress the patient's torso more than 60 times per minute. Additionally or alternatively, the CPR device can include a pressure pad attached to the end of the piston, the pressure pad disposed within the suction cup and not in contact with the suction cup contact surface.

A method of attaching a suction cup to a patient's torso, the suction cup located on an end of a piston of a mechanical CPR device and having a suction cup contact area, in accordance with some examples of the present disclosure can include extending, by the mechanical CPR device, the piston until a first position at which the suction cup comes into contact with the patient's torso. Further extending, by the mechanical CPR device, the piston to cause air to be forced out from an area between the suction cup and the patient's torso, and removing a protective layer disposed between the suction cup contact area and the patient's torso.

These and other features and improvements of the present application and the resultant patent will become apparent to one of ordinary skill in the art upon review of the following detailed description when taken in conjunction with the several drawings and the appended claims.

DETAILED DESCRIPTION

As disclosed herein, examples are directed to a mechanical CPR device having a contact member including a material disposed on a contact member surface. The material can include an adhesion material to increase the sealing effect between a target contact area of the patient's skin and the contact member such that the functionality of the contact member remains and the adherence improved. Additionally or alternatively, the material can include ink such that the patient's torso is automatically marked during a CPR cycle to make it apparent if the contact member has migrated away from a target contact area on the patient's torso.

Figure 1:
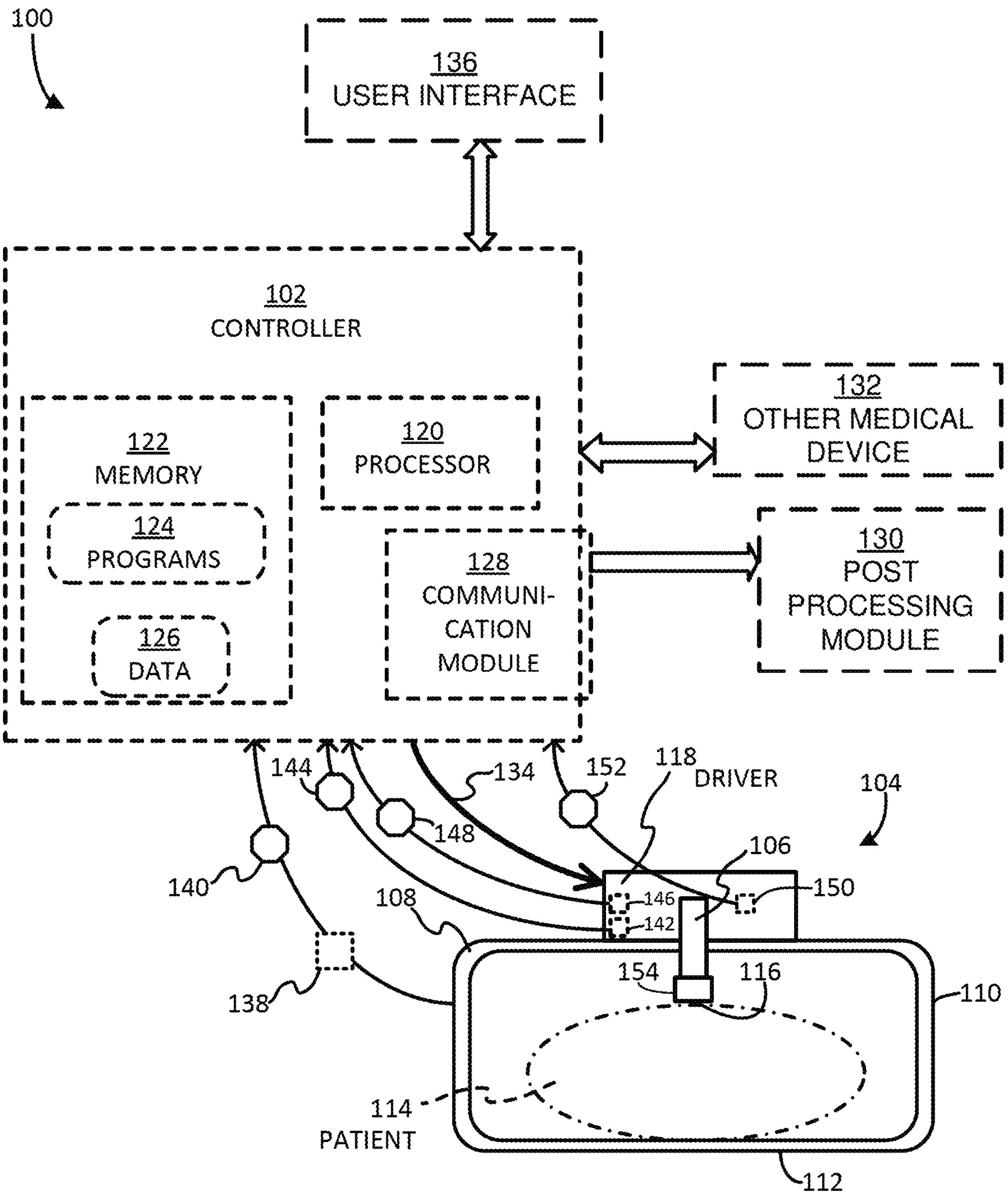
FIG. 1 is a schematic block diagram of an exemplary schematic block diagram of a mechanical CPR device in accordance with the present disclosure.

FIG. 1 illustrates an example schematic block diagram of a mechanical CPR device 100. As will be understood by one skilled in the art, the mechanical CPR device 100 may include additional components not shown in FIG. 1. The mechanical CPR device 100 includes a controller 102, which may be in electrical communication with a chest compression mechanism or device 104. The chest compression mechanism 104 can include a compression element that compresses a chest of a patient, such as a piston based chest compression device or a belt driven device that wraps around a chest of a patient, and an optional contact member, such as a pressure pad, a suction cup, and/or a belt. The compression element in FIG. 1 includes a piston 106 and a contact member 154. Chest compression elements for CPR machines can also include compression arms, such as one or more rigid or semi-rigid arms and/or a compression element and belt combination. The rigid or semi-rigid arms apply a force onto the anterior surface of the patient's chest in a manner similar to that of the piston-style chest compression element. The belt-style chest compression element is often a flexible but resilient and tough material that tightens around some portion of the patient's chest to force its compression element to against the patient's chest to apply the chest compression. Alternatively, the belt holds a compression element, such as a plunger or piston element above the patient's chest and tightens the belt on either side of the plunger or position to cause the force to move the plunger or piston toward the patient's chest. The belt can be made of any suitable material.

Contact member 154 can include a suction cup, a compression pad, a suction cup including a compression pad, a belt, or other device configured to make contact with a patient's chest. The chest compression mechanism 104 can further include a contact surface 116 configured to make contact with a patient's chest. The contact surface 116 can be disposed on the piston 106 or the contact member 154. The chest compression mechanism 104 further can include retention structure 108 including one or more legs 110 and/or a support portion 112 configured to be placed underneath a patient 114.

The chest compression mechanism 104 may include a driver 118 configured to drive the compression mechanism 104 to cause the compression mechanism 104 to perform compressions to a chest of patient 114. The controller 102 provides instructions to the chest compression mechanism 104 to operate the chest compression mechanism 104 at a number of different rates, depths, heights, duty cycles.

The controller 102 may include a processor 120, which may be implemented as any processing circuitry, such as, but not limited to, a microprocessor, an application specific integration circuit (ASIC), programmable logic circuits, etc. The controller may further include a memory 122 coupled with the processor 120. Memory can include a non-transitory storage medium that includes programs 124 configured to be read by the processor 120 and be executed upon reading. The processor 120 is configured to execute instructions from memory 122 and may perform any methods and/or associated operations indicated by such instructions. Memory 122 may be implemented as processor cache, random access memory (RAM), read only memory (ROM), solid state memory, hard disk drive(s), and/or any other memory type. Memory 122 acts as a medium for storing data 126, such as event data, patient data, etc., computer program products, and other instructions.

Controller 102 may further include a communication module 128. Communication module 128 may transmit data to a post-processing module 130. Alternately, data may also be transferred via removable storage such as a flash drive. While in module 130, data can be used in post-event analysis. Such analysis may reveal how the CPR machine was used, whether it was used properly, and to find ways to improve future sessions, etc.

Communication module 128 may further communicate with other medical device 132. Other medical device 132 can be a defibrillator, a monitor, a monitor-defibrillator, a ventilator, a capnography device, or any other medical device. Communication between communication module 128 and other medical device 132 could be direct, or relayed through a tablet or a monitor-defibrillator. Therapy from other device 132, such as ventilation or defibrillation shocks, can be coordinated and/or synchronized with the operation of the CPR machine. For example, compression mechanism 104 may pause the compressions for delivery of a defibrillation shock, afterwards detection of ECG, and the decision of whether its operation needs to be restarted. For instance, if the defibrillation shock has been successful, then operation of the CPR machine might not need to be restarted. Additionally or alternatively, the other medical device 132 can include a ventilator and the ventilator can send instructions to the controller 102 to coordinate chest compressions and ventilation.

The controller 102 may be located separately from the chest compression mechanism 104 and may communicate with the chest compression mechanism 104 through a wired or wireless connection 134. The controller 102 also electrically communicates with a user interface 136. As will be understood by one skilled in the art, the controller 102 may also be in electronic communication with a variety of other devices, such as, but not limited to, another communication device, another medical device, etc.

The chest compression mechanism 104 may include one or more sensors configured to transmit information to controller 102. For example, chest compression mechanism 104 can include a physiological parameter sensor 138 for sensing a physiological parameter of a patient and to output a physiological parameter sensor signal 140 that is indicative of a dynamic value of the parameter. The physiological parameter can be an Arterial Systolic Blood Pressure (ABSP), a blood oxygen saturation (SpO2), a ventilation measured as End-Tidal CO2 (ETCO2), a temperature, a detected pulse, etc. In addition, this parameter can be what is detected by defibrillator electrodes that may be attached to patient, such as ECG and impedance.

Additionally or alternatively, the chest compression mechanism 104 can include a height sensor 142 configured to sense the height of the patient's chest and to output a height signal 144, which is indicative of the resting height of the patient's chest. Additionally or alternatively, the controller 102 can receive the height signal 144 and calculate a reference position, also referred to as a start position, for the compression mechanism 104. Additionally or alternatively, the chest compression mechanism can include a movement sensor 146 configured to sense movement of the patient's chest and to output a movement signal 148, which may indicate ventilation movement of the patient's chest. Additionally or alternatively, the chest compression mechanism 104 can include a pressure sensor 150 configured to sense area(s) of pressure of the contact surface with the patient's chest and to output a pressure signal 152, which is indicative of a dynamic value of pressure against the patient's chest.

Operations of the mechanical CPR device 100 may be effectuated through the user interface 136. The user interface 136 may be external to or integrated with a display. For example, in some examples, the user interface 136 may include physical buttons located on the mechanical CPR device 100, while in other examples, the user interface 136 may be a touch-sensitive feature of a display. The user interface 136 may be located on the mechanical CPR device 100, or may be located on a remote device, such as a smartphone, tablet, PDA, and the like, and is also in electronic communication with the controller 102.

During a CPR session of compressions, controller 102 can generate or receive an instruction (either pre-programmed or customized based on any parameters or other data) to drive the compression mechanism 104 from a reference position towards the patient's chest to a compression position to administer a chest compression. The reference position can be a specific and pre-defined position or can be calculated or estimated based on sensed input or other patient and/or rescuer data. The same or a subsequent instruction can also drive the compression mechanism 104 to move back away from the patient's chest after the applied chest compression.

Figure 2:
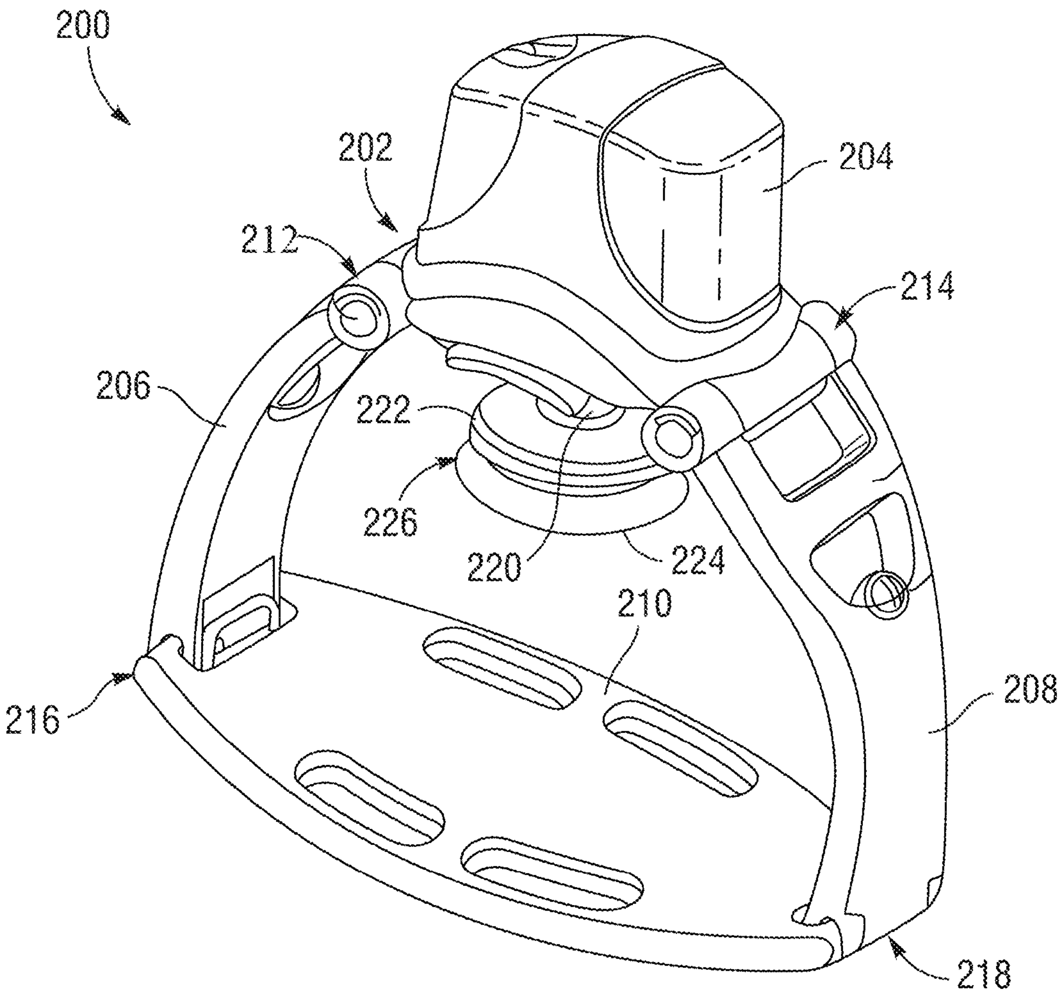
FIG. 2 is an exemplary CPR system including a piston and a contact member in accordance with the present disclosure.

FIG. 2 shows a CPR system 200 including a retention structure 202. The retention structure 202 includes a central member 204, a first leg 206, a second leg 208, and a support portion 210 configured to be placed underneath a patient. Central member 204 is coupled with first leg 206 and with second leg 208 via joints 214 and 214, respectively. In addition, the far ends of legs 206, 208 can become coupled with edges 216, 218 of support portion 210. These couplings form the retention structure 202 that retains a patient. In this particular case, central member 204, first leg 206, second leg 208 and support portion 210 form a closed loop, in which the patient is retained.

Central member 204 includes a battery that stores energy, a motor that receives the energy from the battery, and a compression mechanism that can be driven by the motor. The compression mechanism is driven up and down by the motor using a rack and pinion gear. The compression mechanism includes a compression element, such as a piston 220 that emerges from central member 204, and can compress and release the patient's chest. Piston 220 is sometimes called a plunger. Here, piston 220 terminates in a contact member 222 having a contact surface 224. The contact member 222 can include a pressure pad, a suction cup, or a suction cup including a pressure pad, a belt, or other device configured to contact a patient chest. In the example shown in FIG. 2, the contact member 222 includes a suction cup. Here, the battery, the motor and the rack and pinion gear are not shown, because they are completely within a housing of central member 204.

Figure 3:
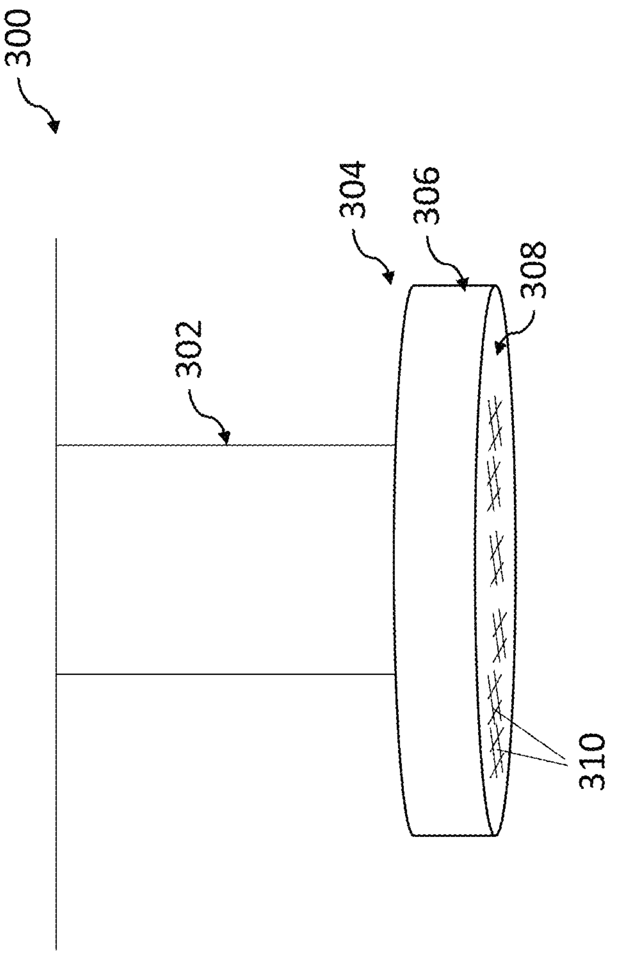
FIG. 3 is a partial view of a CPR device showing a piston and pressure pad.

FIG. 3 is a partial view of a CPR device 300 including a piston 302 and a contact member 304. The contact member 304 in FIG. 3 includes a pressure pad 306. The pressure pad 306 has a pad contact surface 308 including a material 310. The material 310 may cover all or a portion of the pad contact surface 308.

In some examples, the material 310 is configured such that the piston 302 of the CPR device 300 stays in place with respect to a targeted contact area on a patient's chest skin during treatment. In such examples, the material 310 causes the pressure pad 306 to stick to the targeted contact area and prevents the pressure pad 306 from sliding on the patient's chest. Additionally or alternatively, the material 310 can connect the patient's skin to the CPR device 300 in such way that active decompression can be provided regardless of target contact area impurities such as hair or the shape of the patient's chest.

The material 310 may include a semi-adhesive material that is adhesive when in dynamic use and/or has low-to-no adhesiveness when in static use. In other words, the properties of the semi-adhesive material is such that it is strongly adhesive when in dynamic use, such as in use of with a mechanical CPR device where the chest is compressed over 60 times per minute or about 100 times per minute. Additionally or alternatively, the semi-adhesive material adhesiveness is low when in static use, such as when the treatment has been completed and the contact pad is to be removed from the patient or where the chest is compressed less than 60 times per minute. Accordingly, when pulling pad contact surface 308 including the semi-adhesive material manually from the skin with a low and static force, the semi-adhesive material will loosen and come off the patient's skin. The semi-adhesive material can also be referred to as a non-linear adhesive material.

Additionally or alternatively, in some examples the material 310 is configured such that a target area of a patient's chest is automatically marked once the patient's chest is contacted by the material 310 to make it apparent if the pressure pad 306 has migrated away from its initial position. For example, the material 310 can include ink that transfers to patient skin at an initial contact location once the pressure pad 306 is in contact with the patient. In some examples, the ink can transfer to the patient skin during the first compression. In an alternative example, the ink could be visible only under a certain kind of light, for example a black light. An LED of the correct wavelength can be provided on the patient facing side of the CPR device's central member or other patient facing portion of the CPR device. This would reduce the messy appearance of the ink on the chest.

Figure 4:
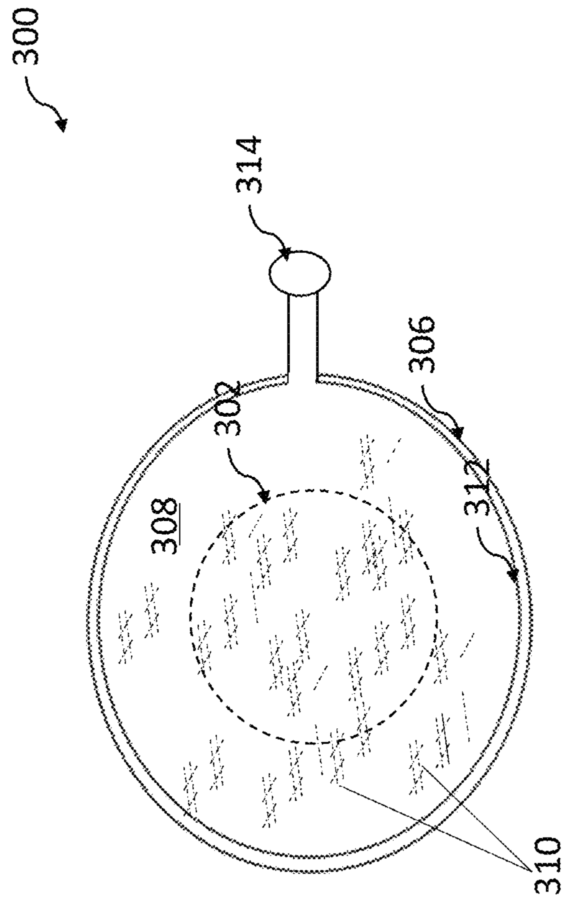
FIG. 4 is an underside view of the piston and pressure pad of FIG. 3 further including an exemplary protective layer.

FIG. 4 shows the underside of the pressure pad 306 of the partial view of the CPR device 300 of FIG. 3. FIG. 4 further shows a pad protection layer 312 disposed on the pad contact surface 308 including the material 310. The pad protection layer 312 may cover all or some of the pad contact surface 308. The pad protection layer 312 can include a pull tab 314, also referred to as a handle. The material 310 can be activated by a user after the mechanical CPR device 300 with pressure pad 304 has been correctly positioned at a target contact area on a patient's chest by removing the pad protection layer 312 via the pull tab 314. After removal of the pad protection layer 312, the chest compression can begin and the material 310 comes in contact with the patient's chest. Once in contact with the patient's skin, the material 310 can adhere the pressure pad 304 to the patient's chest as described above and/or mark the target area of the patient's chest during the first compression.

A pressure pad having a pad contact surface including a material can be used alone or in conjunction with a suction cup as discussed in further detail below. The pressure pad may be a single use accessory to be exchanged before each treatment of a patient. In some examples the pressure pad can be approximately 5 centimeters in diameter and/or include a height of approximately 1 centimeter. The size of the pressure pad may depend on the adhesive properties of the adhesion material and/or the homogeneity/density of the pressure pad material. For example, a pressure pad having an adhesion material having higher adherence may be smaller in diameter. With respect to thickness, the pressure pad includes some adaption to the chest such that the pad is able to attach to the skin despite irregularities due to the shape of the rib cage. However, a pressure pad that is overly thick would be less stiff and the device CPR device would need to compensate for the compression and elongation of the pad during compressions by increasing the stroke length.

Figure 5:
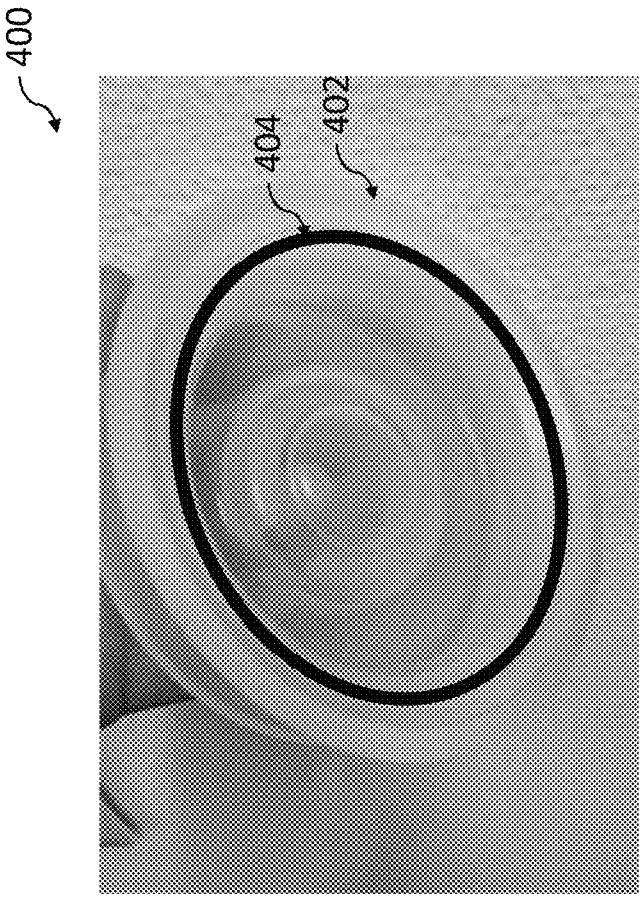
FIG. 5 is a perspective view of a suction cup in accordance with the present disclosure.

FIG. 5 is a perspective view of a suction cup 400 for use with a CPR machine in accordance with the present disclosure. The suction cup 400 has a suction cup contact surface 402 along the perimeter of the underside of the suction cup. The suction cup contact surface can include a material 404 covering all or a portion of the suction cup contact surface. In some examples, the suction cup 400 can be single use.

In some examples, the material 404 is configured to maintain connection of the suction cup contact surface 402 to a target contact area of the patient's chest and/or maintain the CPR device in place on a compression area on the patient's chest using for example, an adhesive. For example, in some examples, the material 404 can include a semi-adhesive material or non-linear adhesive material as discussed above with reference to FIGS. 3 and 4. The material 404 increases the sealing effect between the target contact area of the patient's skin and the suction cup contact surface 402 such that the functionality of the suction cup remains and the adherence improved. In use, the air inside the suction cup 400 is pressed out to reduce the internal volume and create a lower internal air pressure. The material 404 disposed on the suction cup contact area 402 ensures that the adherence between the suction cup contact surface 402 and the patient's skin is high to eliminate air from returning into the suction cup 400. The material 404 is configured to provide a strong connection between the suction cup 400 and the target contact area of the patient's chest and/or is configured to provide for easy detachment of the suction cup 400 from the patient's chest after completion of the compressions or when there is a need for adjustment or possibly re-adjustment of the position of the suction cup 400.

Additionally or alternatively, in some examples the material 404 is configured such that a target area of a patient's chest is automatically marked once the patient's chest is contacted by the material 404 to make it apparent if the suction cup 400 has migrated away from its initial position. For example, the material 404 can include ink that transfers to patient skin at an initial contact location once the suction cup 400 is in contact with the patient. In some examples, the ink can transfer to the patient skin during the first compression. In an alternative example, the ink could be visible only under a certain kind of light, for example a black light. An LED of the correct wavelength can be provided on the patient facing side of the CPR device's central member or other patient facing portion of the CPR device. This would reduce the messy appearance of the ink on the chest.

Figure 6:
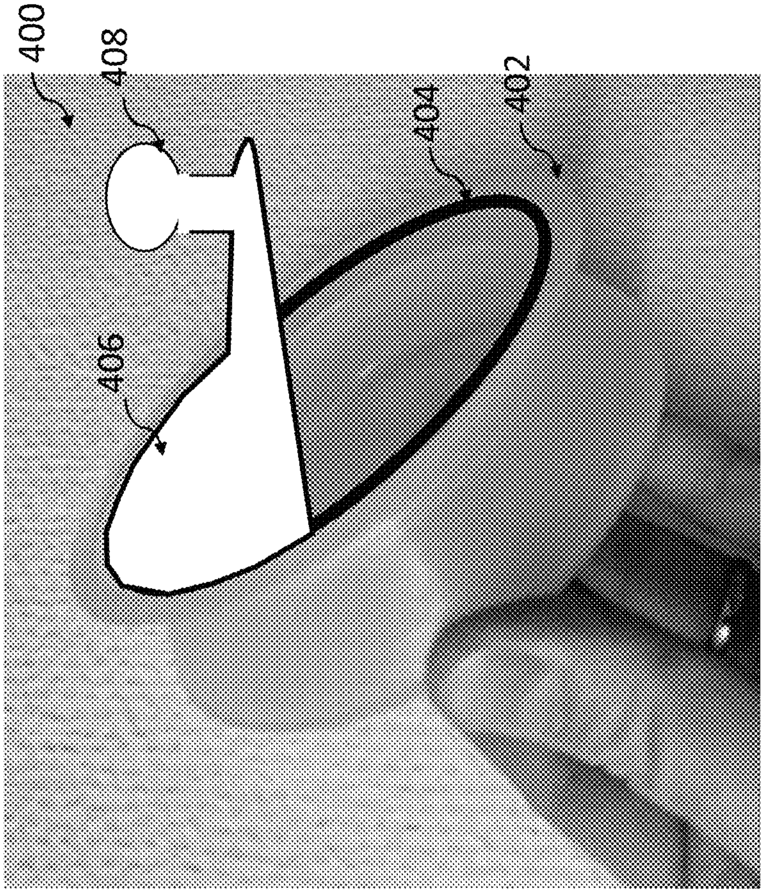
FIG. 6 is a perspective view of the suction cup of FIG. 5 further including a protective layer in accordance with the present disclosure.
Figure 7:
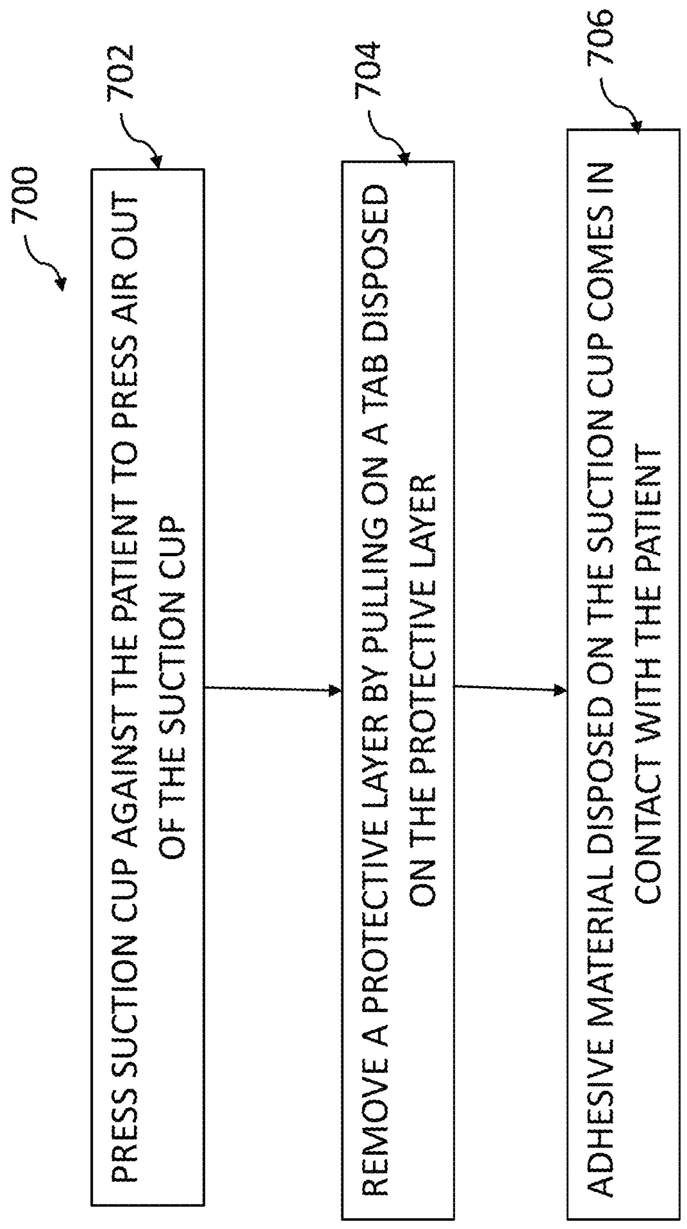
FIG. 7 is an exemplary flow chart of attachment of a CPR device including a piston and a suction cup in accordance with the present disclosure.

FIG. 6 shows a different perspective view of the suction cup 400 of FIG. 5 having a suction cup contact surface 402. In the example shown in FIG. 6, the CPR device further includes a suction cup protective layer 406 having a tab 408 disposed over the suction cup contact surface 404. As shown in FIG. 7, in use, the protective layer initially separates the material from the patient's skin such that air can be pressed out of the suction cup by lowering the suction cup against the patient (702). Once the internal volume of the suction cup is decreased, the protective layer can be removed by a user by pulling a tab (704). When the protective layer is removed, the material comes in contact with the patient's skin (706) during a first compression. The material then adheres to the patient's chest and/or transfers ink to the patient's chest at the contact location.

In use, the air inside the suction cup is pressed out to reduce the internal volume and create a lower internal air pressure. The material disposed on the suction cup contact area can ensure that the adherence between the suction cup contact surface and the patient's skin is high to eliminate air from returning into the suction cup and/or can mark the patient's torso at the point of contact. The material can be configured to provide a strong adhesive connection between the suction cup and the target contact area of the patient's chest and/or is configured to provide for easy detachment of the suction cup from the patient's chest after completion of the compressions or when there is a need for adjustment or possibly re-adjustment of the position of the suction cup. In some examples, the material can include a semi-adhesive material or non-linear adhesive material as discussed above with reference to FIGS. 3-6.

In some examples, the material can include ink and can Additionally or alternatively disposed within the suction cup. The material could automatically be released in the first few compressions by having it be pumped out by the positive-negative pressure cycling of those compressions and releases.

In some examples of a mechanical CPR device, a contact member includes a suction cup attached to the end of a piston. The suction cup has a suction cup contact surface configured to attach to the patient's torso and a material disposed on the suction cup contact surface as previously described. The contact member can further include a pressure pad. The pressure pad can be disposed within the suction cup such that it is not in contact with the suction cup contact surface. The pressure pad includes a pressure pad contact area configured to contact the patient's torso and can include a material disposed on the pressure pad contact area as previously described.

Although CPR devices including a pressure pad and/or a suction cup are pictured, the disclosure includes examples of a CPR device having a band configured to squeeze the chest. A material can be disposed on a patient facing surface of the band. The material can include an adhesive or semi-adhesive as described above. Additionally or alternatively, the material can include ink to mark an initial contact area of the chest.

Examples may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosed systems and methods, and such data structures are contemplated within the scope of computer executable instructions and computer-usable data described herein.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," and "left" are used for convenience and in reference to the views provided in figures. But the [what] may have a number of orientations in actual use. Thus, a feature that is vertical, horizontal, to the right, or to the left in the figures may not have that same orientation or direction in actual use.

Although specific examples have been illustrated and described for purposes of illustration, it will be understood that various modifications may be made without departing from the spirit and scope of the disclosure. Accordingly, the invention should not be limited except as by the appended claims.

What is claimed is:

1. A mechanical cardiopulmonary resuscitation (CPR) device, comprising:

a piston;

a driving component configured to extend the piston toward a patient's torso and retract the piston away from the patient's torso;

a controller configured to perform mechanical CPR by controlling the driving component to at least compress the patient's torso by extending the piston from a reference position to a compression depth and retracting the piston from the compression depth to the reference position, wherein the reference position is the position from which the depth of CPR compressions are measured; and a pressure pad attached to the end of the piston, the pressure pad having a pressure pad contact surface area and a material disposed on the pressure pad contact surface area, the material configured to attach to a target area on the patient's torso, the material including a semi-adhesive material that has low adhesiveness when the controller controls the driving component to compress the patient's torso between 1 and 60 times per minute and high adhesiveness when the controller controls the driving component to compress the patient's torso more than 60 times per minute.

2. The mechanical CPR device of claim 1, further comprising a pressure pad protective layer disposed on the pressure pad such that the material is disposed between the pressure pad contact surface area and the pressure pad protective layer.

3. The mechanical CPR device of claim 1, wherein the controller is further configured to actively decompress the patient's torso by retracting the piston from the reference position to a decompression height.

4. The mechanical CPR device of claim 1, further comprising a suction cup attached to the end of the piston, the suction cup having a suction cup contact surface configured to attach to the patient's torso, the pressure pad disposed within the suction cup and not in contact with the suction cup contact surface.

5. The mechanical CPR device of claim 1, wherein the material includes ink configured to mark an initial contact location on the patient's torso.

6. A mechanical cardiopulmonary resuscitation (CPR) device, comprising: a piston; a driving component configured to extend the piston toward a patient's torso and retract the piston away from the patient's torso; a controller configured to perform mechanical CPR by controlling the driving component to at least compress the patient's torso by extending the piston from a reference position to a compression depth and retracting the piston from the compression depth to a reference position, wherein the reference position is the position from which the depth of CPR compressions are measured; and a suction cup attached to the end of the piston, the suction cup having a suction cup contact surface area and a material disposed on the suction cup contact surface area, the material configured to attach to a target area on a patient chest, wherein the material includes a semi-adhesive material that has low adhesiveness when the controller controls the driving component to compress the patient's torso between 1 and 60 times per minute and high adhesiveness when the patient's torso is compressed more than 60 times per minute.

7. The mechanical CPR device of claim 6, further comprising a suction cup protective layer disposed on the suction cup such that the material is disposed between the suction cup contact surface area and the suction cup protective layer.

8. The mechanical CPR device of claim 6, further comprising a pressure pad attached to the end of the piston, the pressure pad disposed within the suction cup and not in contact with the suction cup contact surface.

9. The mechanical CPR device of claim 8, wherein the pressure pad incudes a pressure pad contact surface and the material is further disposed on the pressure pad contact surface.

10. The mechanical CPR device of claim 6, wherein the material includes ink configured to mark an initial contact location on the patient's torso.

11. A method of attaching a suction cup to a patient's torso, the suction cup located on an end of a piston of a mechanical CPR device and having a suction cup contact area, the method comprising: extending, by the mechanical CPR device, the piston until a first position at which the suction cup comes into contact with the patient's torso; further extending, by the mechanical CPR device, the piston to cause air to be forced out from an area between the suction cup and the patient's torso; and removing a protective layer disposed between the suction cup contact area and the patient's torso, wherein a material is disposed on the suction cup contact area, the method further including adhering the suction cup to the patient's torso when the protective layer is removed, wherein the material includes a semi-adhesive material that has low adhesiveness when the patient's torso is compressed between 1 and 60 times per minute and high adhesiveness when the patient's torso is compressed more than 60 times per minute.

12. The method of claim 11, wherein ink is disposed on the suction cup contact area, the method further including marking a patient's torso with the ink when the protective layer is removed.

13. The method of claim 11, further comprising actively decompressing the patient's torso by retracting a piston from a reference position to a decompression height after the protective layer is removed.

14. The method of claim 11, wherein removing the protective layer includes pulling a tab on the protective layer.

* * * * *